(12) United States Patent
Liu et al.

(10) Patent No.: US 9,860,176 B2
(45) Date of Patent: Jan. 2, 2018

(54) DATA PACKET PROCESSING

(71) Applicant: International Business Machines Corporation, Armonk, NY (US)

(72) Inventors: Tian Cheng Liu, Beijing (CN); Hang Liu, Beijing (CN); Bao Hua Yang, Beijing (CN); Yue Zhang, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/908,724

(22) PCT Filed: Jul. 9, 2014

(86) PCT No.: PCT/CN2014/081875
§ 371 (c)(1),
(2) Date: Jan. 29, 2016

(87) PCT Pub. No.: WO2015/014198
PCT Pub. Date: Feb. 5, 2015

(65) Prior Publication Data
US 2016/0191392 A1 Jun. 30, 2016

(30) Foreign Application Priority Data
Jul. 31, 2013 (CN) .......................... 2013 1 0328512

(51) Int. Cl.
*H04L 12/803* (2013.01)
*H04L 12/64* (2006.01)
(Continued)

(52) U.S. Cl.
CPC ........ *H04L 47/125* (2013.01); *H04L 12/6418* (2013.01); *H04L 45/38* (2013.01);
(Continued)

(58) Field of Classification Search
None
See application file for complete search history.

(56) References Cited

U.S. PATENT DOCUMENTS 7,768,919 B1 8/2010 Conway
2002/0122228 A1 9/2002 Rappaport et al.
(Continued)

OTHER PUBLICATIONS

International Search Report dated Jul. 11, 2016, issued in International Application No. PCT/CN2014/081875.
(Continued)

*Primary Examiner* — Diane Lo
(74) *Attorney, Agent, or Firm* — Scully, Scott, Murphy & Presser, P.C.; Rabin Bhattacharya

(57) ABSTRACT

The present invention relates to data packet processing in a data network, and provides a method and system for processing data packets. The method comprising: dividing flows containing data packets into elephant flows and mice flows according to a particular division parameter, wherein, an elephant flow contains more data packets than a mice flow; transmitting the divided elephant flows and mice flows to a virtual switch in a server; processing the mice flows at the virtual switch, and transmitting the elephant flows and the processed mice flows to a hardware switch in network; and processing the elephant flows at the hardware switch, and forwarding the received mice flows and the processed elephant flows. With the method and system, network performance may be effectively improved.

12 Claims, 5 Drawing Sheets

(51) Int. Cl.
  *H04L 12/721* (2013.01)
  *H04L 12/851* (2013.01)
  *H04L 12/715* (2013.01)
  *H04L 12/931* (2013.01)
(52) U.S. Cl.
  CPC .......... *H04L 45/64* (2013.01); *H04L 47/2441* (2013.01); *H04L 49/70* (2013.01)

(56) References Cited

U.S. PATENT DOCUMENTS

| | | |
|---|---|---|
| 2008/0270399 A1 | 10/2008 | Feng et al. |
| 2011/0222394 A1 | 9/2011 | Swinkels et al. |
| 2011/0320632 A1* | 12/2011 | Karino .................. H04L 45/586 709/238 |
| 2012/0020361 A1 | 1/2012 | Ueno |
| 2012/0275328 A1 | 11/2012 | Iwata et al. |
| 2012/0287791 A1 | 11/2012 | Xi et al. |
| 2012/0324442 A1 | 12/2012 | Barde |
| 2014/0098813 A1* | 4/2014 | Mishra .................. H04L 12/185 370/390 |
| 2014/0362705 A1* | 12/2014 | Pan ....................... H04L 47/125 370/237 |
| 2014/0365622 A1* | 12/2014 | Iyengar ............... H04L 67/1097 709/220 |

OTHER PUBLICATIONS

Curtis, et al., "DevoFlow: Scaling Flow Management for High-Performance Networks", SIGCOMM'11, Aug. 15-19, 2011, Toronto, Ontario, Canada.

Detal et al., "Revisiting Flow-Based Load Balancing: Stateless Path Selection in Data Center Networks", preprint submitted to Elsevier Dec. 10, 2012, pp. 1-19.

International Search Report PCT/CN2014/081875.

* cited by examiner

DATA PACKET PROCESSING

TECHNICAL FIELD

The present invention relates to data network, and more specifically, to a method and system for processing data packets in a data network.

BACKGROUND

With the ever increasing network scale, there are more and more users, emergence of technologies such as virtualization helps multiple users to better utilize the network, meanwhile, it also present higher requirement for flexibility of the network. Support for multiple users needs to share network resource, and also needs to perform isolation among multiple users to ensure security. Software Defined Networking can satisfy user's flexibility demand for network, but meanwhile it will also cause network performance degradation, because processing load will occur both at switch or server side, thereby encounter processing bottleneck.

SUMMARY

In view of the above problems, there is a need of providing a solution for improving network performance.

According to one embodiment of the present invention, there is provided a method for processing data packets, comprising: dividing flows containing data packets into elephant flows and mice flows according to a particular division parameter, wherein, an elephant flow contains more data packets than a mice flow; transmitting the divided elephant flows and mice flows to a virtual switch in a server; processing the mice flows at the virtual switch; and transmitting the elephant flows and the processed mice flows to a hardware switch in network, so as that the hardware switch may process the elephant flows and forward the processed elephant flows and the received processed mice flows.

According to one embodiment of the present invention, there is also provided a method for processing data packets, comprising: dividing flows containing data packets into elephant flows and mice flows according to a particular division parameter, wherein, an elephant flow contains more data packets than a mice flow; transmitting the divided elephant flows and mice flows to a virtual switch in a server; processing the mice flows at the virtual switch, and transmitting the elephant flows and the processed mice flows to a hardware switch in network; and processing the elephant flows at the hardware switch, and forwarding the processed elephant flows and the received processed mice flows.

According to one embodiment of the present invention, there is also provided a system for processing data packets in a server, comprising: a divider configured to divide flows containing data packets into elephant flows and mice flows according to a particular division parameter and transmit them to a virtual switch, wherein, the elephant flow contains more data packets than the mice flow; and a virtual switch configured to process the mice flows from the divider and transmit the received elephant flows and the processed mice flows to a hardware switch in network, so as that the hardware switch may process the elephant flows and forward the processed elephant flows and the received processed mice flows.

According to one embodiment of the present invention, there is also provided a system for processing data packets in a server, comprising: a divider in a server, configured to divide flows containing data packets into elephant flows and mice flows according to a particular division parameter and transmit them to a virtual switch, wherein, the elephant flow contains more data packets than the mice flow; a virtual switch in the server, configured to process the mice flows from the divider and transmit the received elephant flows and the processed mice flows to a hardware switch in network; and a hardware switch in the network, configured to process the elephant flows and then forward the processed elephant flows and the received processed mice flows.

In this way, by simply processing mice flows containing less data packets at a virtual switch of a server and transmitting elephant flows containing more data packets to a hardware switch in network for processing, requirement for CPU at server side can be reduced, thereby avoiding forwarding delay due to bottleneck in CPU processing capability.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
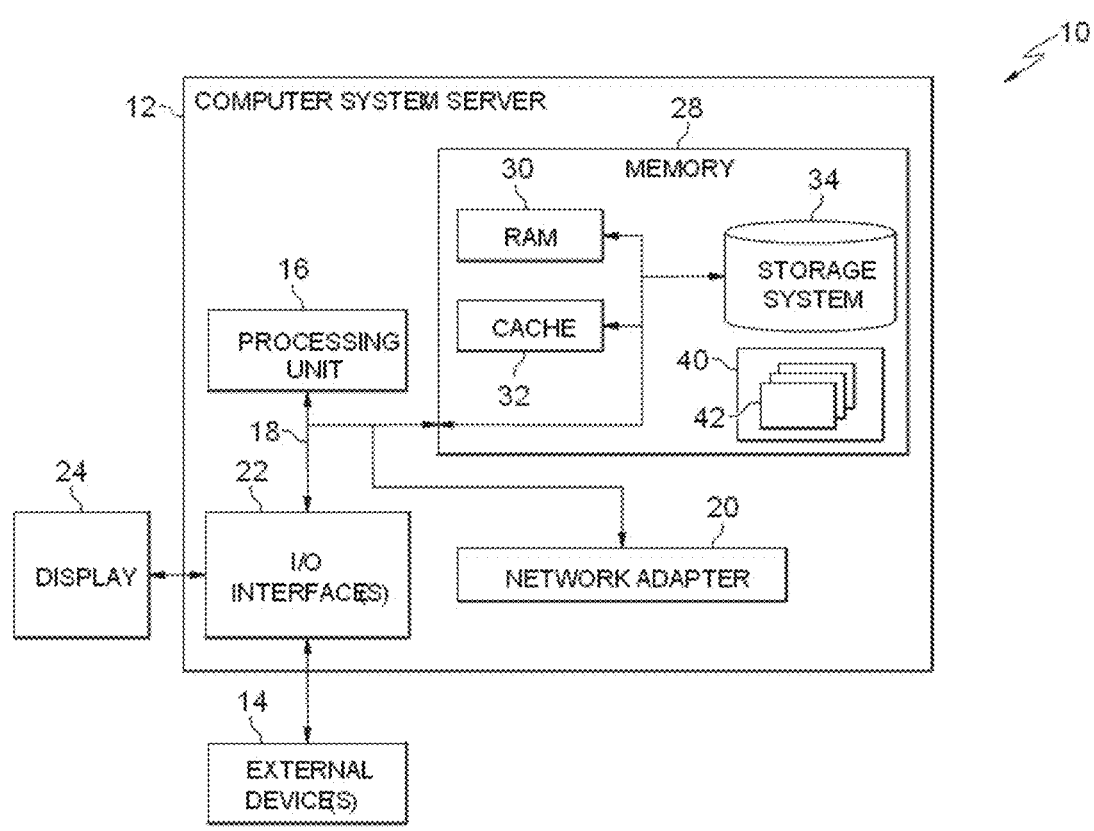
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
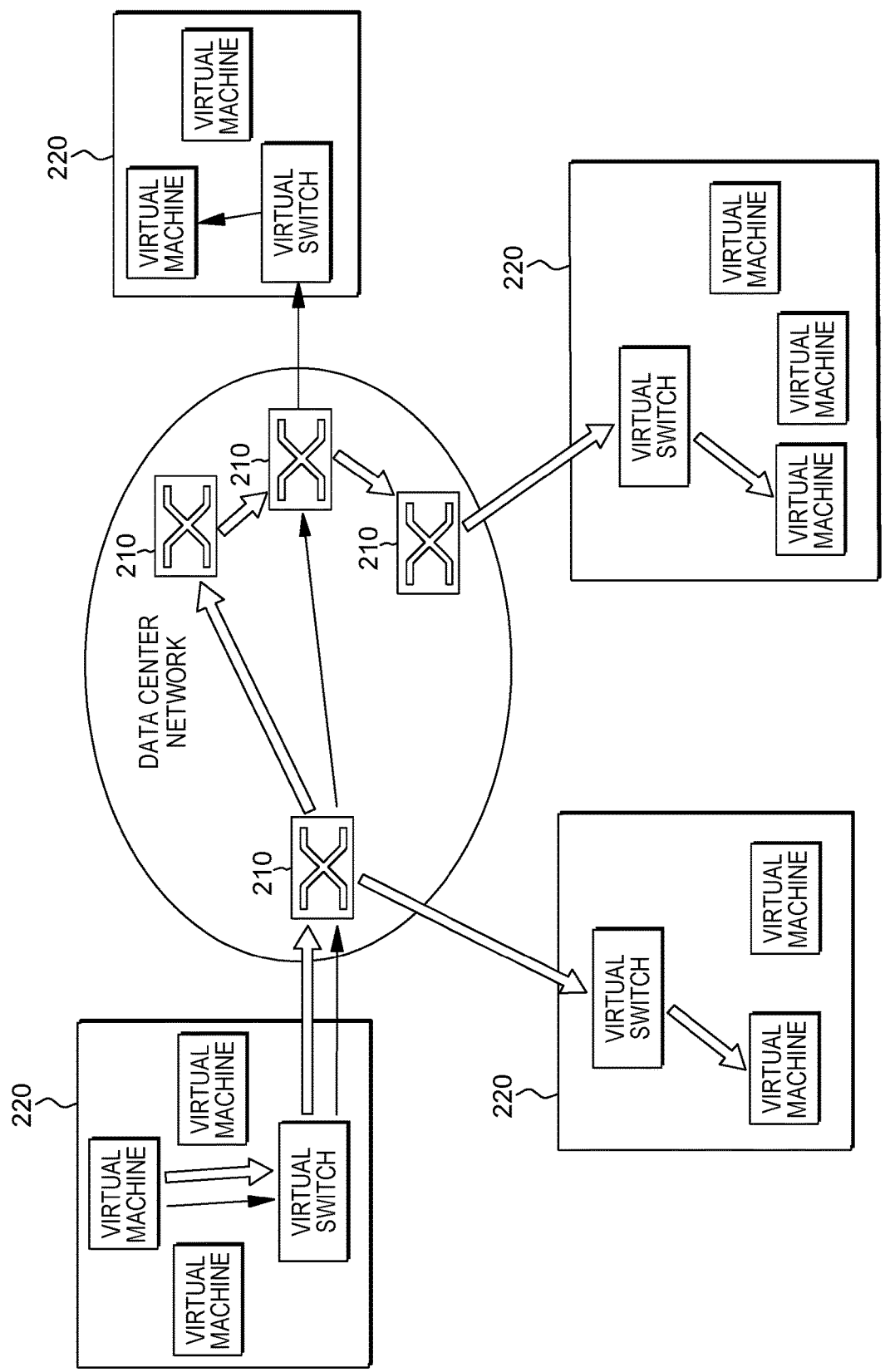
FIG. 2 shows a diagram of architecture of an exemplary data center network.

FIG. 2 shows a diagram of architecture of an exemplary data center network. It should be noted that, although a data center network is taken as an example for describing various embodiments of the invention, the invention is not limited to data center network, rather, the present invention is applicable to any type of network. As shown in FIG. 2, the data center network may include multiple hardware switches 210, here, a hardware switch refers to a network signal forwarding device for interconnecting among multiple network nodes. Via the multiple hardware switches 210, a server 220 is connected to the data center network. Here, the server 220 may be a server on which multiple virtual machines are realized, or may be any other physical server. The server 220 contains therein a virtual switch vSwitch, i.e. a software switch realized in the server, and the virtual switch may be used to interconnect multiple virtual machines in the server.

Data packets are transmitted in form of a flow within the server and the data center network. Here, a flow refers to a group of data packets having same quintet (source IP, destination IP, source mac, destination mac, and port number), generally, data packets within a same flow have relevance therebetween and typically belong to one network application.

Inventor of the invention has found that, under the architecture of the data center network shown in FIG. 2, at server side, as input load increases, processing requirement for CPU of the server increase proportionally, such that CPU becomes bottleneck in processing. Extra consumption of CPU will waste computation resource, such that expense of tenants will also be wasted.

Meanwhile, at hardware switch side, a flow table has limited size. If time-out period for flow rule is set to relatively long, such as longer than 35 seconds, then size of flow entries need to be stored will exceed 2 k, which makes flow table of the switch overflow, resulting in processing bottleneck at switch side.

Inventor of the invention observes that, within traffic of a data center network, there are elephant flows and mice flows, in which number of elephant flows per se is relatively small, however, each elephant flow contains a large amount of data packets; on the other hand, number of mice flows per se is relatively large, however, they contain much less data packets as compared to an elephant flow.

At server side, most CPU time is consumed by processing of data packets of elephant flows, packet processing time of elephant flows is much large than that of mice flows. This is due to the fact that, processing of data packets on virtual switch will consume general CPU, and elephant flows containing more data packets will consume more CPU resource. Meanwhile, another inevitable system overhead is network I/O for forwarding data packets, and CPU consumed by network I/O for forwarding elephant flows is also much larger than that of mice flows.

While at switch side, as to flow entries for buffering flows, the need for flow entries for buffering elephant flows is much smaller than that for buffering all the flows and is more stable. For example, if time-out period for a cache is set to 30 seconds, then on average 56 flow entries and at most 300 flow entries will be needed to buffer an elephant flow, which can be easily realized by a switch commonly used at present. If all the flows are to be buffered, then on average 1741 flow entries will be needed and there will be significant variation.

Based on the above observation, we propose a method and system for processing data packets according to various embodiments of the invention.

Figure 3:
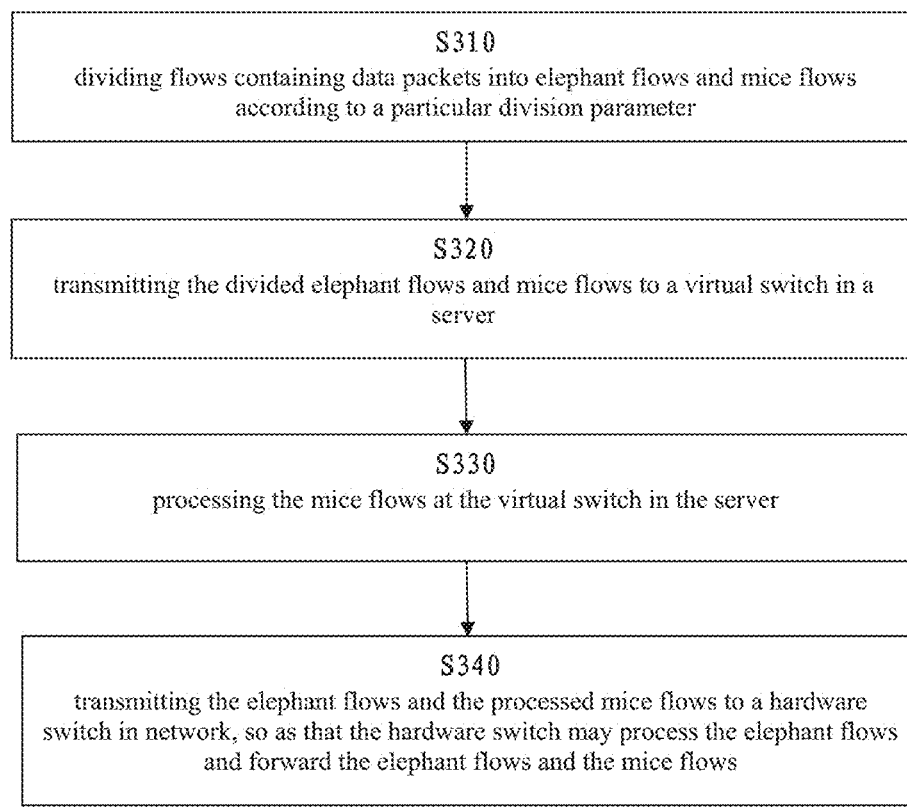
FIG. 3 shows a flowchart of a method for processing data packets according to one embodiment of the invention.

FIG. 3 shows a flowchart of a method for processing data packets according to one embodiment of the invention.

In step S310, dividing flows containing data packets into elephant flows and mice flows according to a particular division parameter. Wherein, an elephant flow contains more data packets than a mice flow. According to an embodiment of the invention, in context of virtual machine, flows may be from respective virtual machines.

According to an embodiment of the invention, the particular division parameter may be a threshold. Number of data packets of each flow is recorded, and if the number of data packets in a flow is lower than the threshold, that flow is divided as a mice flow; and if the number is equal to or larger than the threshold, that flow is divided as an elephant flow.

According to an embodiment of the invention, the divided flows may be identified. The identifying may be performed only on elephant flows, or only on mice flows, or may be performed on both elephant flows and mice flows, respectively. For example, the identifying may be performed by utilizing existing tag bits (such as, vlan, tos) in a data packet, or by adding a new location.

In step S320, transmitting the divided elephant flows and mice flows to a virtual switch in a server.

In step S330, processing the mice flows at the virtual switch.

According to an embodiment of the invention, whether a flow is a mice flow may be judged by checking a tag in the data packet. If it is a mice flow, then processing operation is performed on the mice flow, the processing operation may comprise operation such as buffering flow information, replacing packet header, encapsulating, decapsulating etc.

In step S340, transmitting the elephant flows and the processed mice flows to a hardware switch in network, so as that the hardware switch may process the elephant flows and forward the processed elephant flows and the received processed mice flows.

Wherein, the hardware switch distinguishes an elephant flow from a mice flow by checking a tag in data packet. If it is an elephant flow, then processing operation on elephant flow is performed, such as buffering flow information, replacing packet header, encapsulating etc. If it is not an elephant flow, no processing is performed, and it is directly forwarded to a core network or a hardware switch at destination side.

In this way, by simply processing mice flows containing less data packets at a virtual switch of a server and transmitting elephant flows containing more data packets to a hardware switch in network for processing, requirement for CPU at server side can be reduced, thereby avoiding forwarding delay due to bottleneck in CPU processing capability.

According to an embodiment of the invention, the particular division parameter may be dynamically adjusted based on load related information of the virtual switch and the hardware switch.

For example, load status may be periodically fed back to a monitor in network. The monitor collects load data on the virtual switch and the hardware switch periodically, or the switch may periodically feedback load parameter to the monitor. The monitor allocates proper division threshold based on monitoring data so as to reach load balance between the virtual switch and the hardware switch. For example, the monitor may collect necessary load data, CPU occupancy rate, memory occupancy rate etc on the virtual switch and the hardware switch, and calculate load occupancy rate by comprehensively considering various data indices. For example, the value having the highest occupancy rate, i.e. system bottleneck, may be selected as load occupancy rate, and then division parameter for elephant flows and mice flows is adjusted based on load condition of the virtual switch and the hardware switch. If load of the virtual switch is high, the parameter is adjusted to allocate more load to the hardware switch (e.g., reduce division threshold by 10% to divide more flows as elephant flow). On the contrary, if load of the hardware switch is high, the threshold is increased by 10%. If load are close (the difference is within 10%), the load is regarded as balanced, and the division parameter will not be adjusted.

Figure 4:
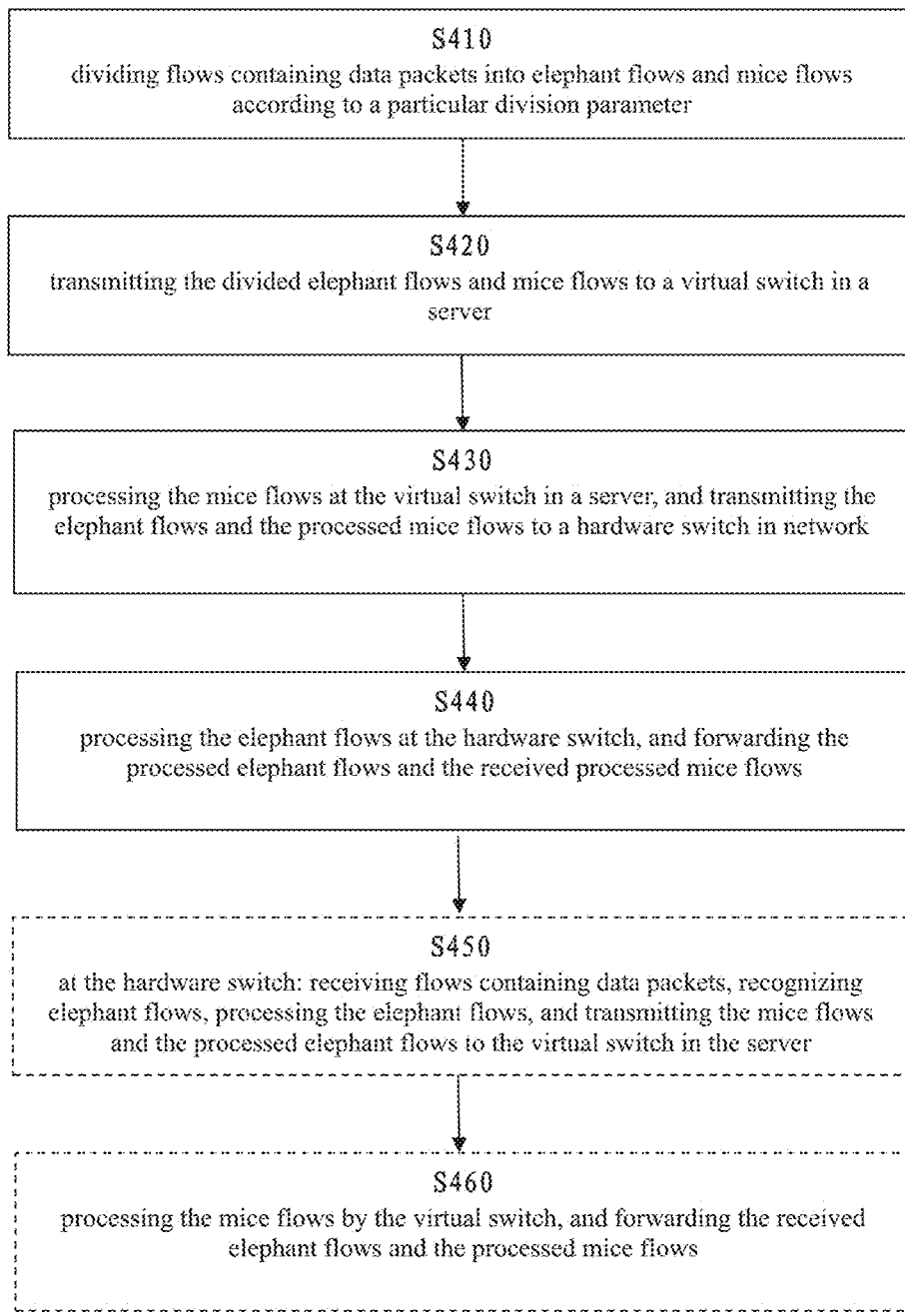
FIG. 4 shows a flowchart of a method for processing data packets according to another embodiment of the invention.

FIG. 4 shows a flowchart of a method for processing data packets realized by a server and a switch in network together according to one embodiment of the invention.

In step S410, dividing flows containing data packets into elephant flows and mice flows according to a particular division parameter. Wherein, an elephant flow contains more data packets than a mice flow.

In step S420, transmitting the divided elephant flows and mice flows to a virtual switch in a server.

In step S430, processing the mice flows at the virtual switch, and transmitting the elephant flows and the processed mice flows to a hardware switch in network.

In step S440, processing the elephant flows at the hardware switch, and forwarding the processed elephant flows and the received processed mice flows.

When transmitting a data packet, the data packet first goes through the virtual switch on the server (access switch at transmitting side) before arriving at the hardware switch in network. While the order of receiving the data packet is just the opposite, the data packet first goes through the hardware switch on network (access switch at receiving side) before arriving at the virtual switch on the destination server, and finally arrives at the receiving party.

For some applications that need symmetrical operations, for example, packets need to be encapsulated after being transmitted from transmitting side and need to be decapsulated before arriving at receiving side, the receiving side also needs to conduct processing in reverse order, that is, elephant flows are first processed by the hardware switch, then mice flows are processed by the virtual switch. For operations that need not to be processed at receiving side, such as security detection, packets only need to be processed after being transmitted from transmitting side, and the receiving side, whether it is the virtual switch or the hardware switch, will directly forward them (equivalent to processing instruction being null).

Thus, according to one embodiment of the invention, FIG. 4 may further comprise a step S450: at the hardware switch in network: receiving flows containing data packets, recognizing elephant flows, processing the elephant flows, and transmitting the mice flows and the processed elephant flows to the virtual switch in the server.

According to one embodiment of the invention, in the step S450, the hardware switch may recognize elephant flows based on an identifier contained in data packets in the flow. Alternatively, the hardware switch may also re-divide elephant flows and mice flows according to current load condition, for example, the method described above is used to divide flows into elephant flows and mice flows based on a particular division parameter, wherein an elephant flow contains more data packets than a mice flow.

Then, in step S460, processing the mice flows by the virtual switch, and forwarding the processed mice flows and the received processed elephant flows.

According to one embodiment of the invention, the virtual switch is a transmitting side switch as well as a receiving side switch. This means that, both the transmitting side and the receiving side are on a same physical server (maybe different virtual machines or different processes). In this case, data packets will not go through the hardware switch, thus they are all processed on the virtual switch. According to one embodiment of the invention, the virtual switch may further judge whether its received flows are forwarded locally. For example, the virtual switch may judge whether a data packet is forwarded locally based on mac address thereof. If yes, all flows are processed on the virtual switch.

According to one embodiment of the invention, the hardware switch is a transmitting side switch as well as a receiving side switch, for example, if both the transmitting party and the receiving party are connected to a same hardware switch, then the hardware switch will, after it has completed transmitting side processing, directly perform receiving side processing. For symmetry application (such as encapsulating and decapsulating), processing will not be performed, which depends on specific application.

Figure 5:
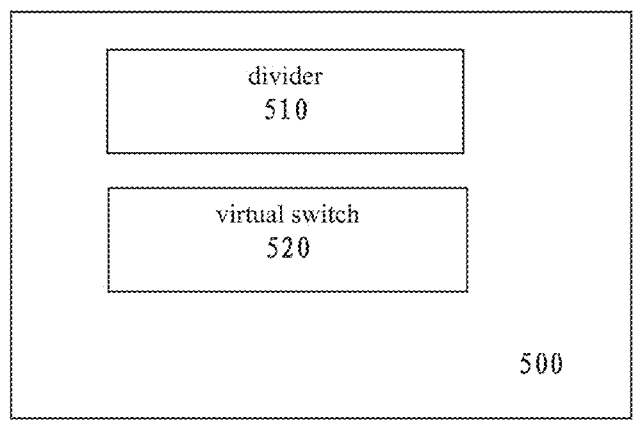
FIG. 5 shows a block diagram of a system for processing data packets according to one embodiment of the invention.

FIG. 5 shows a block diagram of a system for processing data packets at server side according to one embodiment of the invention. The system comprises a divider 510 and a virtual switch 520. The divider 510 is configured to divide flows containing data packets into elephant flows and mice flows according to a particular division parameter and transmit them to the virtual switch 520. Wherein, the elephant flow contains more data packets than the mice flow. The virtual switch 520 is configured to process the mice flows from the divider and transmit the received elephant flows and the processed mice flows to a hardware switch, so as that the hardware switch may process the elephant flows and forward the processed elephant flows and its received processed mice flows.

Wherein, the divider 510 is further configured to identify the divided flows.

According to one embodiment of the invention, the particular division parameter may be dynamically adjusted based on load related information of the virtual switch and the hardware switch. The particular division parameter may a threshold, the divider 510 may record number of data packets of each flow, divide the flow of which the number is lower than the threshold as a mice flow and divide the flow of which the number is equal to or larger than the threshold as an elephant flow.

Figure 6:
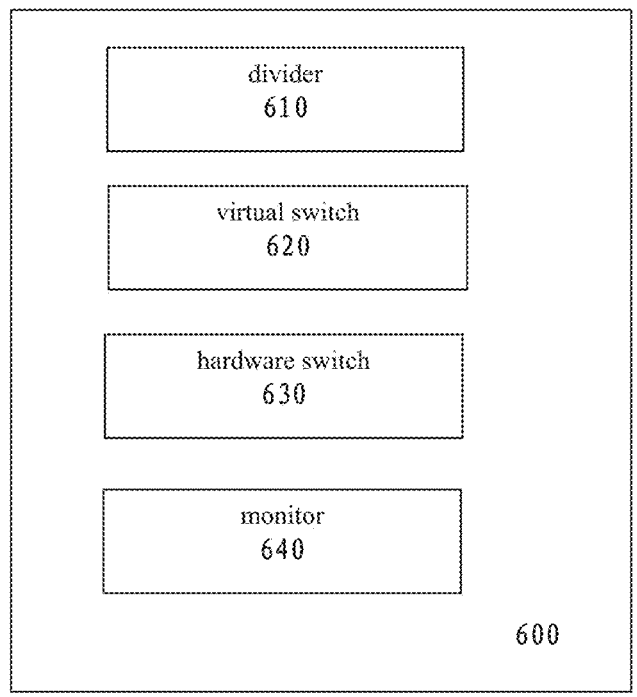
FIG. 6 shows a block diagram of a system for processing data packets according to another embodiment of the invention.

FIG. 6 shows a block diagram of a system for processing data packets according to one embodiment of the invention. The system comprises a divider 610 and a virtual switch 620 at server side and a hardware switch 630 in network. The divider 610 is configured to divide flows containing data packets into elephant flows and mice flows according to a particular division parameter and transmit them to the virtual switch 620. Wherein, the elephant flow contains more data packets than the mice flow. The virtual switch 620 is configured to process the mice flows from the divider and transmit the received elephant flows and the processed mice flows to the hardware switch 630 in network. The hardware switch 630 is configured to process the elephant flows and then forward the processed elephant flows and the received processed mice flows.

According to one embodiment of the invention, the system 600 further comprises a monitor 640 configured to dynamically adjust the particular division parameter based on load related information of the virtual switch 620 and the hardware switch 630.

When transmitting a data packet, the data packet first goes through the virtual switch on the server (access switch at transmitting side) before arriving at the hardware switch in network. While the order of receiving the data packet is just the opposite, the data packet first goes through the hardware switch on network (access switch at receiving side) before arriving at the soft switch on the destination server, and finally arrives at the receiving party.

According to one embodiment of the invention, the hardware switch is a transmitting side switch as well as a receiving side switch. In case of being a receiving side switch, the hardware switch 630 may be further configured to receive flows containing data packets; recognize elephant flows; process the elephant flows; transmit the mice flows and the processed elephant flows to the virtual switch in the server; and the virtual switch 610 is configured to process the mice flows, and forward the received elephant flows and the processed mice flows.

According to one embodiment of the invention, the hardware switch 630 may recognize the elephant flows based on an identifier contained in data packets within the flows. Alternatively, the hardware switch 630 may also re-divide elephant flows and mice flows according to current load condition, for example, the method described above is used to divide flows into elephant flows and mice flows based on a particular division parameter, wherein an elephant flow contains more data packets than a mice flow.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing data packets, comprising:
dividing flows containing data packets into at least one elephant flow and at least one mice flow according to a particular division parameter, wherein the at least one elephant flow contains more data packets than the at least one mice flow;
transmitting the divided at least one elephant flow and at least one mice flow to a virtual switch in a server;
processing the at least one mice flow at the virtual switch; and
transmitting the at least one elephant flow and the processed at least one mice flow to a hardware switch in a network;
processing the at least one elephant flow at the hardware switch;
forwarding the processed at least one elephant flow and the received processed at least one mice flow from the hardware switch to a network node in the network;
determining respective load conditions of the virtual switch and the hardware switch; and
adjusting the particular division parameter based on the determined respective load conditions of the virtual switch and the hardware switch to reach a load balance between the virtual switch and the hardware switch.

2. The method according to claim 1, further comprising: identifying the divided flows.

3. The method according to claim 1, wherein the particular division parameter is a threshold, wherein the step of dividing flows containing data packets into at least one elephant flow and at least one mice flow according to a particular division parameter comprises: recording a number of data packets of each flow, dividing the flow of which the number is lower than the threshold as the at least one mice flow, and dividing the flow of which the number is equal to or larger than the threshold as the at least one elephant flow.

4. The method according to claim 1, wherein the processing comprises one or more of buffering flow information, replacing packet headers, encapsulating, and decapsulating.

5. The method according to claim 1, further comprising:
at the hardware switch:
receiving other flows containing other data packets;
recognizing other at least one elephant flow and other at least one mice flow from said other flows;
processing said other at least one elephant flow;
transmitting the received said other mice flow and the processed other at least one elephant flow to the virtual switch in the server;
processing said other at least one mice flow at the virtual switch; and
forwarding the processed other at least one mice flow and the received processed other at least one elephant flow.

6. The method according to claim 5, wherein the recognizing other at least one elephant flow and other at least one mice flow comprises: recognizing said other at least one elephant flow based on an identifier contained in said other data packets within said other flows.

7. The method according to claim 5, wherein the recognizing other at least one elephant flow and other at least one mice flow comprises: dividing said other flows into said other at least one elephant flow and said other at least one mice flow according to the particular division parameter, wherein said other at least one elephant flow contains more data packets than said other at least one mice flow.

8. A system for processing data packets in a server, comprising:
a divider configured to divide flows containing data packets into at least one elephant flow and at least one mice flow according to a particular division parameter and transmit the at least one elephant flow and the at least one mice flow to a virtual switch, wherein the at least one elephant flow contains more data packets than the at least one mice flow;
the virtual switch configured to process the at least one mice flow received from the divider and transmit the received at least one elephant flow and the processed at least one mice flow to a hardware switch in a network;
the hardware switch configured to process the at least one elephant flow and forward the processed at least one elephant flow and the received processed at least one mice flow to a network node in the network; and
at least one processor configured to determine respective load conditions of the virtual switch and the hardware switch,
wherein the particular division parameter is adjusted based on the determined respective load conditions of the virtual switch and the hardware switch to reach a load balance between the virtual switch and the hardware switch.

9. The system according to claim 8, wherein the hardware switch is further configured to:
receive other flows containing other data packets;
recognize other at least one elephant flow and other at least one mice flow from said other flows;
process said other at least one elephant flow; and
transmit the received said other mice flow and the processed other at least one elephant flow to the virtual switch in the server;
the virtual switch is configured to process said other at least one mice flow and forward the processed other at least one mice flow and the received processed other at least one elephant flow.

10. The system according to claim 9, wherein the hardware switch is further configured to recognize said other at least one elephant flow based on an identifier contained in said other data packets within said other flows.

11. The system according to claim 9, wherein, the hardware switch is further configured to divide said other flows into said other at least one elephant flow and said other at least one mice flow according to the particular division parameter, wherein said other at least one elephant flow contains more data packets than said other at least one mice flow.

12. A computer program product comprising a computer readable non-transitory storage medium having one or more program codes embedded therewith, said one or more program codes executable by a computer to cause said computer to perform a method of processing data packets comprising:
dividing flows containing data packets into at least one elephant flow and at least one mice flow according to a particular division parameter, wherein the at least one elephant flow contains more data packets than the at least one mice flow;
transmitting the divided at least one elephant flow and at least one mice flow to a virtual switch in a server;
processing the at least one mice flow by the virtual switch; and
transmitting the at least one elephant flow and the processed at least one mice flow to a hardware switch in a network;
processing the at least one elephant flow at the hardware switch;
forwarding the processed at least one elephant flow and the received processed at least one mice flow from the hardware switch to a network node in the network;
determining respective load conditions of the virtual switch and the hardware switch; and
adjusting the particular division parameter based on the determined respective load conditions of the virtual switch and the hardware switch to reach a load balance between the virtual switch and the hardware switch.

* * * * *